2 Sheets—Sheet 1.
T. J. WHITECAR.
COMBINED SEED-DRILL AND HARROW.
No. 189,821. Patented April 17, 1877.
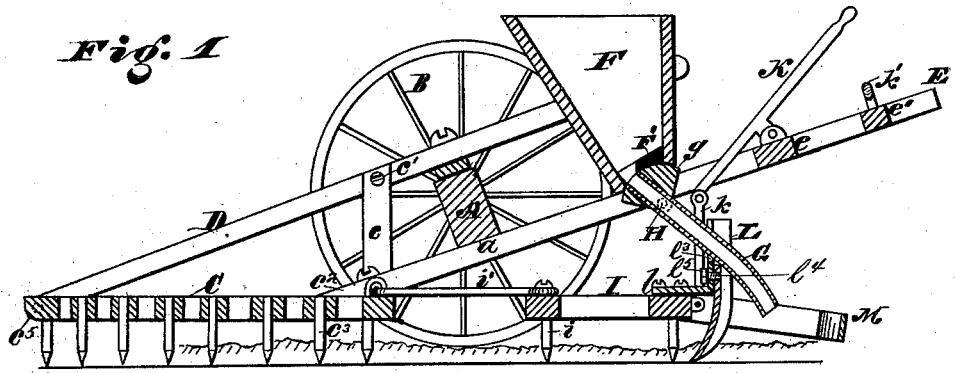
Fig. 1
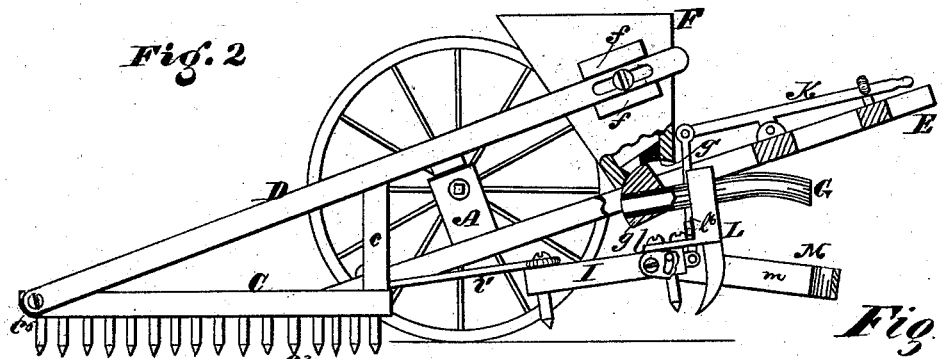
Fig. 2
Fig. 6
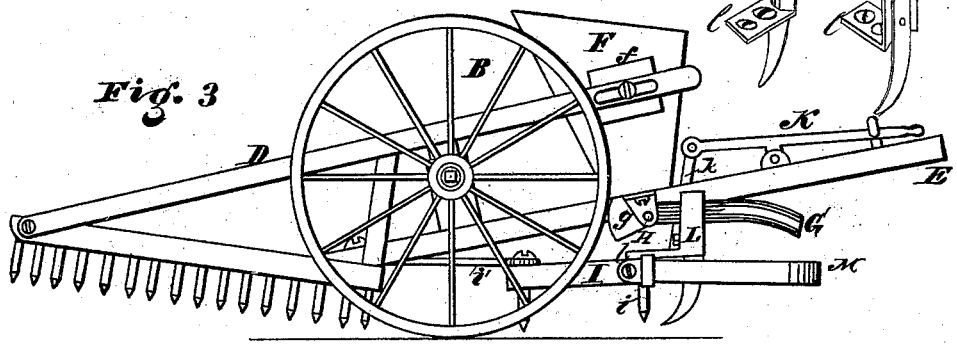
Fig. 3
Witnesses
Saml. J. Van Stavoren
Chas. H. Higgins
Inventor
Thos. J. Whitecar,
By Connolly Bros., Attorneys
N. PETERS, PHOTO-LITHOGRAPHER, WASHINGTON, D. C.

T. J. WHITECAR.
COMBINED SEED-DRILL AND HARROW.

No. 189,821. Patented April 17, 1877.

Witnesses
Saml. J. Van Staveren
Chas. H. Higgins

Inventor
Thos. J. Whitecar
By Connolly Bros.,
Attorneys

UNITED STATES PATENT OFFICE.

THOMAS J. WHITECAR, OF PHILADELPHIA, PENNSYLVANIA.

IMPROVEMENT IN COMBINED SEED-DRILL AND HARROW.

Specification forming part of Letters Patent No. 189,821, dated April 17, 1877; application filed February 22, 1877.

*To all whom it may concern:*

Be it known that I, THOMAS J. WHITECAR, of Philadelphia, in the county of Philadelphia and State of Pennsylvania, have invented a certain new and useful Combined Seed-Drill and Harrow; and I do hereby declare the following to be a full, clear, and exact description of the invention, such as will enable others skilled in the art to which it pertains to make and use it, reference being had to the accompanying drawings, which form part of this specification, in which—

Figure 4:
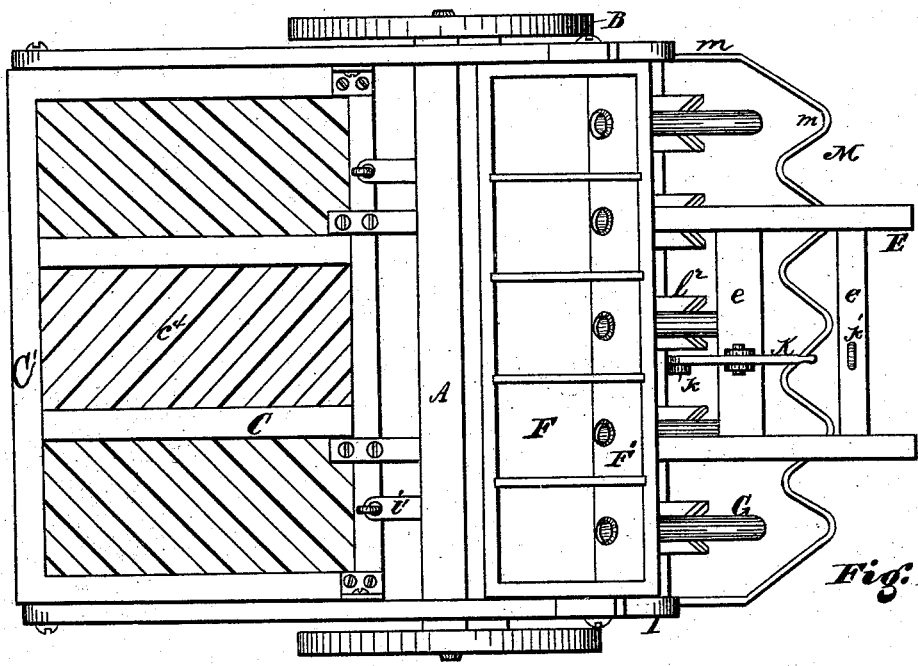
Figure 5:
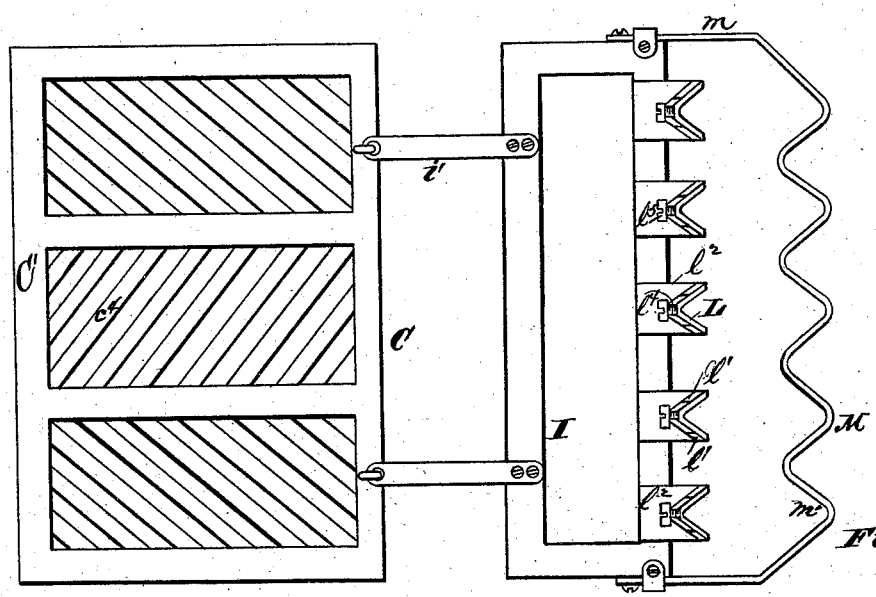

Figure 1 is a longitudinal vertical section; Fig. 2, side elevation, partly in section; Fig. 3, side elevation; Fig. 4, plan; Fig. 5, plan of harrows. Fig. 6 represents, in perspective, front and rear views, respectively, of the flukes.

My invention has for its object to provide a combined seed-drill and harrow so constructed that the harrow can be used alone or in conjunction with the drill.

My improvements consist in the peculiar construction and combination of parts, as hereinafter more fully set forth.

Referring to the accompanying drawing, A designates an axle, mounted on wheels B B. C is a rectangular frame, connected by means of straps $c$ $c$ and bolts $c^1$ $c^1$ with two side bars or beams, D D, supported on the axle A. E E are handles, rigidly fastened to the under side of the axle A at $a$ $a$, and to the harrow-frame at $c^2$ $c^2$.

By depressing the handles E E at their rear ends, the harrow-frame C will be raised clear of the ground, and its teeth $c^3$, which are fastened in diagonal bars $c^4$, drawn out of the soil.

F is the seed-hopper, sustained on the rear ends of the beams D D, and having ways or guides $f$ $f$, between which said beams pass, and by means of which the desired attachment is secured, such attachment permitting the hopper to be readily removed, by merely sliding it backward, whenever it is desired to use the harrow alone.

The bottom of the hopper has suitable orifices for the escape of the seed. Below said bottom are tubes G, swung on a rod, H, or furnished with an equivalent pivotal connection or support, and terminating in heads or blocks $g$. The tubes G pass through the blocks $g$, so as to register with the openings in the bottom of the hopper, and form passages for the seed from said hopper to the ground.

By swinging the tubes, as hereinafter set forth, their registry or coincidence with the openings in the hopper-bottom is broken, the heads $g$ passing into position to close said openings, and operating for that purpose as valves.

Recesses or chambers $g'$ are made in the hopper-bottom F', forming seats for said valves or heads $g$. I represents a rectangular frame, having harrow-teeth $i$ $i$. Said frame is connected with the frame C by strap-hinges $i'$ $i'$, and with the cross-bar $e$ of the handles E E by means of a rod, $k$, having a swivel-connection with a lever, K, fulcrumed on said cross-bar. $k'$ is a staple on the cross-bar $e'$, beneath which the lever K passes when depressed. L L are flukes, formed with lugs or ears $l$ $l$, by means of which they are fastened to the frame I. Said flukes are also bifurcated at their upper ends, forming forks $l^1$ $l^1$, in which the tubes G rest, as shown.

I prefer to make these flukes, however, in two separate parts, as shown in Figs. 1 and 5, so as to permit their vertical adjustment on the frame I. To effect this I make the L-shaped bracket $l^2$ with a vertical slot, $l^3$, below, or forming a continuation of the opening between the forks $l^1$. A threaded rod or screw, $l^4$, passes into the slot $l^3$, and is held fast by a nut, $l^5$, and, if desired, a washer, $l^6$. By loosening the nut $l^5$, and moving the screw $l^4$ up or down, as desired, in the slot $l^3$, the fluke L, which is attached to said screw, will be vertically adjusted in its bracket, or on the frame I. M represents a scraper for covering the seed, said scraper being formed of a corrugated strip of metal, having ends $m$ $m$ bent toward the frame I, to the sides of which it is secured. The inward ribs of said scraper, $m'$ $m'$, are in a line between the flukes L L, so as to throw the soil from the ridges formed by said flukes into the furrows on both sides, and cover the seed deposited therein by the tubes G.

The operation is substantially as follows: The lever K being depressed and fastened beneath the staple $k'$, the frame I and scraper M are thereby elevated from the ground, and the tubes G swung so as to cause their heads g to close the openings in the hopper-bottom, preventing the discharge of seed from the latter. Now, on depressing the handles E E, the frame C will be raised from the ground, so that the machine can travel to the field clear of all obstructions. On reaching the field where it is desired to sow, the lever K is released from the staple $k'$, permitting the frame I to descend, bringing the flukes L and scraper M into contact with the ground, and swinging the tubes G so as to cause them to register with the openings in the hopper-bottom. The handles E E are at the same time elevated, bringing the teeth of the frame C into the soil. On moving the machine forward the ground will be pulverized by the teeth of the frames C and I, the front bar of said frame C being beveled or rounded at $c^5$, forming a shoe, $C'$, which is an effectual clod-crusher. The flukes L make furrows, into which the seed from the tubes G pass, being covered therein by the action of the scraper M.

To suspend the flow of seed, the lever K is depressed and fastened beneath the staple $k'$. To raise the harrow-frame C to drop or leave brush or other débris, the handles E E are depressed or lowered. To use the harrow alone the hopper is slid off the bars D D, the other parts I L M being removed or allowed to remain, as may be desired.

What I claim as my invention is—

1. In combination with the axle A and adjustable harrow-frame C, the bars D D, resting on said axle, and the handles E E, separate from the bars D D, and rigidly secured to the axle, and arranged, as described, for raising and lowering the harrow, substantially as set forth.

2. In combination with the frame C, the frame I, hinged thereto, and sustaining flukes L, substantially as shown and described.

3. In combination with the harrow-frame supporting-bars D D, the hopper F, secured to said bars by blocks $f$, forming ways or guides, permitting the detachment of said hopper by merely sliding it off, as set forth.

4. The seed-tubes G, formed with heads $g$, which operate as valves to close the openings in the hopper-bottom, substantially as described.

5. The hopper-bottom $F'$, recessed at $g'$, to form seats for the heads or valves $g$ on the seed-tubes G, substantially as shown and described.

6. The flukes L, bifurcated at their upper extremities, to form forks for the reception of the tubes G, substantially as shown and described.

7. The flukes L, formed in two parts, one part being vertically adjustable upon the other, substantially as set forth.

8. In combination with the tubes G, the frame I, supporting the flukes L, arranged and operating substantially as described, so as that when said frame is raised the said tubes will be swung out of registry with the seed-openings in the hopper and the flow of seed stopped.

9. In combination with a seeding-machine, the scraper M, formed of a strip or bar of corrugated metal, arranged for operation substantially as shown and described.

10. The rod $k$ and lever K, in combination with the supplementary harrow-frame and the attached scraper and flukes, substantially as described.

In testimony that I claim the foregoing I have hereunto set my hand this 16th day of February, 1877.

THOMAS J. WHITECAR.

Witnesses:
SAML. J. VAN STAVOREN,
CHAS. F. VAN HORN.